G. W. BROWNELL.
DEVICE FOR MOLDING TIRE TREADS.
APPLICATION FILED SEPT. 8, 1920.
1,364,241.
Patented Jan. 4, 1921.
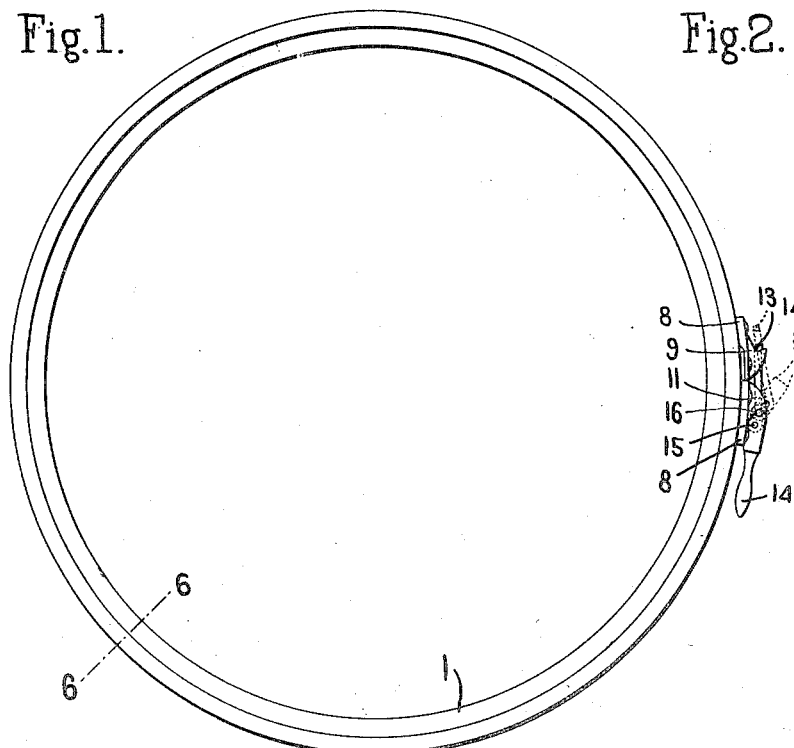
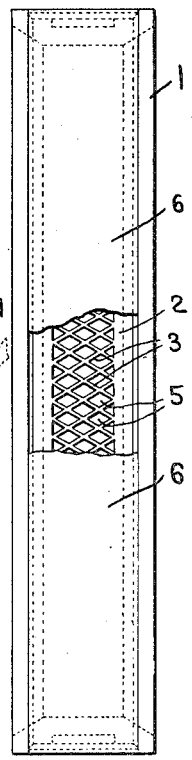
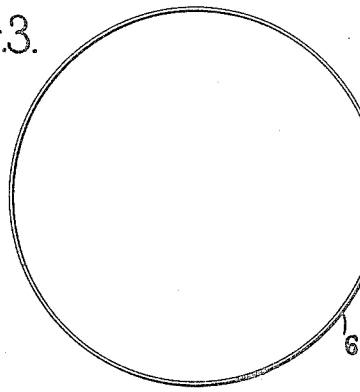
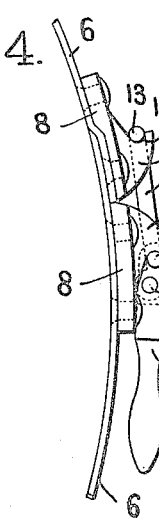
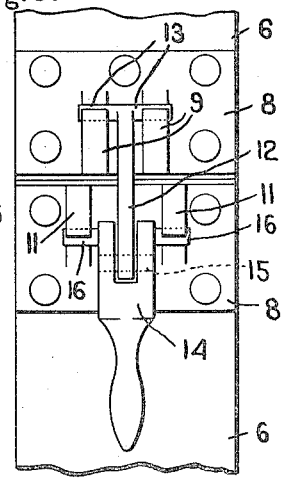
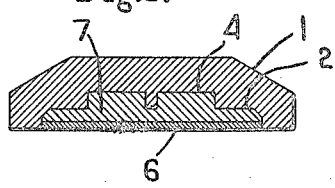
Inventor.
George W. Brownell
by Heard, Smith & Tennant.
Attys.

UNITED STATES PATENT OFFICE.

GEORGE W. BROWNELL, OF LEOMINSTER, MASSACHUSETTS.

DEVICE FOR MOLDING TIRE-TREADS.

1,364,241.         Specification of Letters Patent.     Patented Jan. 4, 1921.

Application filed September 8, 1920. Serial No. 409,017.

*To all whom it may concern:*

Be it known that I, GEORGE W. BROWNELL, a citizen of the United States, and resident of Leominster, county of Worcester, State of Massachusetts, have invented an Improvement in Devices for Molding Tire-Treads, of which the following description, in connection with the accompanying drawing, is a specification, like characters on the drawing representing like parts.

This invention relates to a mold adapted for molding tire treads such as are applied to pneumatic and other tires, and it has for its object to provide a novel mold for this purpose which is simple and inexpensive to manufacture and is also easy to operate.

In order to give an understanding of the invention, I have illustrated in the accompanying drawings a selected embodiment thereof which will now be described, after which the novel features will be pointed out in the appended claims.

In the drawings, Figure 1 is a side view of a mold embodying my invention;

Fig. 2 is an edge view thereof with a portion broken out;

Fig. 3 is a view of the exterior band;

Fig. 4 is a side view of the locking device for the band;

Fig. 5 is a front view of said locking device;

Fig. 6 is an enlarged section on the line 6—6, Fig. 1.

My improved mold comprises an annular body member 1, which has a peripheral cavity or chamber 2 in which the tire tread is molded. This chamber 2 extends clear around the periphery of the member 1, and is formed centrally with either ribs or depressions 3 having the shape which it is desired to give to the tread surface of the tire. In the construction shown this central portion is formed with an annular recess 4 which has crossing ribs extending diagonally thereacross as seen best in Fig. 2, wherein a portion of the outer band is broken out for the purpose of illustrating this feature.

This construction will form a tread having diamond-shape projections corresponding to the pockets or depressions 5 between the crossing ribs 3.

The mold also comprises an exterior band 6 which is of a width corresponding to that of the cavity 2, and which is divided so that it can be readily removed from or applied to the body 1. When this band 6 is in position in the mouth of the cavity 2, as shown in Fig. 6, there will be formed between it and the bottom of the cavity a space which defines the dimensions of the molded tire tread.

In using the device, the cavity 2 is filled with the rubber or rubber compound from which the tread is to be molded, and then the band 6 is placed into position and firmly clamped against the rubber, thus causing the rubber mass to completely fill the cavity 2. When the band 6 is in place, it occupies the mouth of the cavity as shown in Fig. 6, and the surplus rubber will be forced out of the cavity around the edges of the band 6. After the band 6 has been thus applied, the rubber is cured, vulcanized, or otherwise treated, and when the treating process is completed the band 6 is removed, thus permitting the molded tire tread 7 to be taken out from the cavity 2. The tire tread is an annular band with the tread surface on the interior thereof, and after it has been molded, it is necessary to turn it inside out to bring the tread surface on the outside before applying it to the tire.

The band 6 is in the form of a spring metal split band, and a combined clamping and locking device is employed for clamping the band around the mold member 1 and locking it in this position while the rubber is being cured or treated.

Each end of the band 6 has a plate 8 riveted thereto, and each plate has two separated lugs rising therefrom. The two lugs on one of the plates are indicated at 9 and each is provided with a notch 10 in its rear side. The lugs on the other plate are indicated at 11 and each has a similar construction. Coöperating with these lugs is a combined clamping and locking member comprising a link 12 having arms 13 extending laterally therefrom at one end, and which are adapted to engage in the notches 10, and a forked handle member 14 which is pivoted to the other end of the link 12, as shown at 15, and is provided with two arms 16 adapted to engage in the notches in the lugs 11. In using this device, the handle is placed in a position relative to the link, such as shown in dotted lines, Fig. 1 and the projections 13 are placed in engagement with the notches 10, while the projections 16 are placed in engagement with the notches in the lugs 11. The handle is then swung down into the full line position, Figs. 1 and 4, and this operation draws the ends of the band 6 closer together. When the handle is carried fully into the full line position shown in Figs. 4 and 5, the pivotal point 15 is carried past the center of the arms 16, thereby locking the handle in such position. A swinging movement of the handle from the full to the dotted line position, Fig. 1, will unlock the clamping device, thus permitting it to be removed from the band, after which the band can easily be separated from the mold member 1.

It will be observed that my improved mold is relatively simple in construction and is easy to manipulate.

I claim:

1. In a mold for molding tire treads, the combination with an annular mold member having a peripheral tread-forming cavity, of a split clamping band encircling said mold member, and adapted to fit into the mouth of the cavity, and means for locking the ends of the band together.

2. In a mold for molding tire treads, the combination with an annular mold member having a peripheral tread-forming cavity, the bottom of which is shaped to give the desired contour to the tread surface of the tire tread, of a split clamping band encircling said mold member and fitting within the mouth of said cavity, said band having notched lugs at its ends, and a toggle locking member engaging said lugs and locking the ends of the band together.

3. In a mold for molding tire treads, the combination with an annular mold member having a peripheral tread-forming cavity, of a split clamping member encircling the mold member and fitting within the mouth of said cavity, said clamping member having a pair of notched lugs at each end, and a locking member comprising a link having projections at one end to engage the notches of the lugs of one pair, and a handle member pivoted to the other end of the link member and having projections to engage the notches of the lugs of the other pair.

In testimony whereof, I have signed my name to this specification.

GEO. W. BROWNELL.